(12) United States Patent
Cao

(10) Patent No.: US 8,649,608 B2
(45) Date of Patent: Feb. 11, 2014

(54) FEATURE VALUE EXTRACTING DEVICE, OBJECT IDENTIFICATION DEVICE, AND FEATURE VALUE EXTRACTING METHOD

(75) Inventor: Yunyun Cao, Tokyo (JP)

(73) Assignee: Panasonic Corporation, Osaka (JP)

( * ) Notice: Subject to any disclaimer, the term of this patent is extended or adjusted under 35 U.S.C. 154(b) by 318 days.

(21) Appl. No.: 13/128,473

(22) PCT Filed: Nov. 6, 2009

(86) PCT No.: PCT/JP2009/005920
§ 371 (c)(1),
(2), (4) Date: May 10, 2011

(87) PCT Pub. No.: WO2010/055629
PCT Pub. Date: May 20, 2010

(65) Prior Publication Data
US 2011/0243434 A1      Oct. 6, 2011

(30) Foreign Application Priority Data
Nov. 11, 2008  (JP) ................................. 2008-288864

(51) Int. Cl.
*G06K 9/00*       (2006.01)
(52) U.S. Cl.
USPC .......................................... 382/199; 382/165
(58) Field of Classification Search
USPC ......... 382/100, 155, 162, 168, 169, 170, 172, 382/173, 181, 190, 199, 197, 195, 276, 254, 382/266, 209, 145, 149, 141, 205, 165; 342/450; 348/113, 171, 196; 378/62; 340/146.3, 945; 250/472.1, 483.1, 250/484.2, 484.4; 356/625, 630; 346/74.5; 430/207
See application file for complete search history.

(56) References Cited

U.S. PATENT DOCUMENTS

| | | | |
|---|---|---|---|
| 8,015,132 B2 * | 9/2011 | Xu | .................................... 706/20 |
| 8,027,514 B2 * | 9/2011 | Takaki et al. | ................. 382/103 |
| 2001/0046321 A1 | 11/2001 | Murakawa | |
| 2008/0247651 A1 | 10/2008 | Takaki et al. | |

FOREIGN PATENT DOCUMENTS

| | | |
|---|---|---|
| JP | 5-210739 | 8/1993 |
| JP | 11-66310 | 3/1999 |
| JP | 2001-175868 | 6/2001 |
| JP | 2003-263638 | 9/2003 |

(Continued)

OTHER PUBLICATIONS

Sami Brandt et al.. "Statistical Shape Features in Content-Based Image Retrieval". Proceedings of the 15th International Conference on Pattern Recognition, vol. 2, pp. 1062-1065 (Sep. 2000).

(Continued)

*Primary Examiner* — Sheela Chawan
(74) *Attorney, Agent, or Firm* — Greenblum & Bernstein, P.L.C.

(57) ABSTRACT

A feature calculator calculates the number of edge pixel pairs (three-dimensional histogram) defined by the edge direction of a predetermined pixel, the edge direction of an edge pixel present in a neighboring area of the predetermined pixel, and the spatial position relation between the predetermined pixel and the edge pixel present in the neighboring area of the predetermined pixel as a feature of an image. With this, the feature also represents the spatial relationship of the edges. Consequently, it is possible to also identify the difference of edge patterns due to the difference of the spatial relationships of the edges and increase the accuracy of identification of, for example, a portrait image.

6 Claims, 7 Drawing Sheets

(56) References Cited

FOREIGN PATENT DOCUMENTS

| | | |
|---|---|---|
| JP | 2006-127159 | 5/2006 |
| JP | 2007-156626 | 6/2007 |
| JP | 2008-4123 | 1/2008 |
| JP | 2008-26974 | 2/2008 |
| JP | 2008-257649 | 10/2008 |
| JP | 2008-269181 | 11/2008 |

OTHER PUBLICATIONS

Japan Office action, mail date is May 28, 2013.

* cited by examiner

FEATURE VALUE EXTRACTING DEVICE, OBJECT IDENTIFICATION DEVICE, AND FEATURE VALUE EXTRACTING METHOD

TECHNICAL FIELD

The present invention relates to an image feature extracting apparatus, object identification apparatus, and image feature extracting method, and relates, for example, to a technology that determines whether or not a provided grayscale image is an image of a human being.

BACKGROUND ART

Conventionally, edge features are often used to classify whether a given grayscale image contains a human being. For example, a feature of histogram of edge directions HOG (Histograms of Oriented Gradients) is proposed for object identification (see Patent Literature 1 through 3, for example).

For an grayscale image I of M×N (M: wide, N: height), suppose the number of edge directions is $N_i$. A certain number of binary edge direction images $E_i$ (i=1, ..., $N_i$) are generated from I. Here, $E_i$ is defined by the following equation.

(Equation 1)

$$E_i(x,y)=1, \text{ if the edge direction at position } (x,y) \text{ is } i.$$

$$E_i(x,y)=0, \text{ otherwise} \quad [1]$$

Where i is the edge direction number, i=1, ..., $N_i$,
$N_i$: Total number of edge direction An edge direction histogram (HOG) is defined by the following equation.

(Equation 2)

$$H(i) = \frac{1}{NM} \sum_{x=0}^{M-1} \sum_{y=0}^{N-1} E_i(x, y) \quad [2]$$

i: edge direction number, i=1, ..., $N_i$
$N_i$: total number of edge directions Using an edge direction histogram enables the edge image in FIG. 1A and the edge image in FIG. 1B to be discriminated. That is to say, using an edge direction histogram enables images with different edge directions to be discriminated.

However, with an identification method using an edge direction histogram, statistical features of an entire image are calculated, and therefore discrimination between FIG. 1B and FIG. 1C, for example, is difficult. This is because the accumulation of edge directions is the same in the edge image in FIG. 1B and the edge image in FIG. 1C. As a result, false recognition occurs.

Thus, the use of edge co-occurrence has been proposed as one method capable of differentiating between the edge image in FIG. 1B and the edge image in FIG. 1C (see Non-Patent Literature 1, for example). This method uses a co-occurrence matrix of edge direction as a feature indicating edge co-occurrence. Co-occurrence matrix of edge direction $H_{CO}(i,j)$ is represented by the following equation.

(Equation 3)

$$H_{co}(i, j) = \frac{1}{NM} \sum_{x=0}^{M-1} \sum_{y=0}^{N-1} \left[ E_i(x, y) \sum_{(x', y') \in R(x,y)} E_j(x', y') \right] \quad [3]$$

i, j: Edge direction number, i=1, ..., $N_i$, j=1, ..., $N_j$
$N_i$, $N_j$: Total number of edge directions
R(x, y): Neighboring area of (x, y)

With an image identification method that uses edge direction co-occurrence, an edge direction within a neighboring area is taken into consideration in performing identification, and therefore correct identification is possible even for an edge image that cannot be correctly classified using only edge direction accumulation, as in the case of an edge direction histogram.

CITATION LIST

Patent Literature

PTL 1
Japanese Patent Application Laid-Open No. HEI5-210739
PTL 2
Japanese Patent Application Laid-Open No. 2003-263638
PTL 3
Japanese Patent Application Laid-Open No. 2007-156626

Non-Patent Literature

NPL 1
Sami Brand, Jorma Laaksonen, Erkki Oja, "Statistical Shape Features in Content-Based Image Retrieval", Proceedings of the 15th International Conference on Pattern Recognition (ICPR'2000), Volume 2, pp. 6062

SUMMARY OF INVENTION

Technical Problem

However, with an image identification method that uses a conventional co-occurrence matrix of edge directions as described in Non-Patent Literature 1, the spatial relationship of edges is not sufficiently considered, and therefore there is a risk of false recognition of an object. With an image classification method that uses a conventional co-occurrence matrix of edge directions, it is difficult to differentiate between FIG. 1C and FIG. 1D, for example. Incidentally, the kind of edge pattern shown in FIG. 1D often appears in an "elbow" of a human image, and the kind of edge pattern shown in FIG. 1C often appears in a "tree". Therefore, when attempting to identify a pedestrian, for example, there is a possibility of false recognition of a "tree" image as an image of a pedestrian, which illustrates a deficiency of such a method.

It is therefore an object of the present invention to provide a feature extracting apparatus, object identification apparatus, and feature extracting method capable of identifying a difference in edge patterns due to a difference in spatial relationships of edges, and capable of improving the accuracy of identification of a human image, for example.

Solution to Problem

One aspect of a feature extracting apparatus of the present invention employs a configuration having a feature calculation section that calculates a number of edge pixels stipulated by an edge direction of a predetermined pixel and/or an edge direction of an edge pixel present in a neighboring area of the predetermined pixel, and a spatial relationship between the predetermined pixel and an edge pixel present in the neighboring area, as a feature of an image.

One aspect of an object identification apparatus of the present invention employs a configuration having: the feature extracting apparatus; a plurality of weak classifiers that have a plurality of features obtained by the feature extracting apparatus as input, and output an estimate from an input feature and a classification function acquired by learning beforehand; a combining section that sums estimates output from the plurality of weak classifiers; and a determination section that performs a threshold value determination of a summed estimate.

One aspect of a feature extracting method of the present invention includes: an edge image generating step of generating an edge image from a grayscale image; and a feature calculation step of calculating a number of edge pixels stipulated by an edge direction of a predetermined pixel and/or an edge direction of an edge pixel present in a neighboring area of the predetermined pixel, and a spatial relationship between the predetermined pixel and an edge pixel present in the neighboring area, as a feature of an image.

Advantageous Effects of Invention

The present invention can identify a difference in edge patterns due to a difference in spatial relationships of edges, and can improve the accuracy of identification of a human image, for example.

DESCRIPTION OF EMBODIMENTS

Now, an embodiment of the present invention will be described in detail with reference to the accompanying drawings.

[Overall Configuration]

Figure 1A:
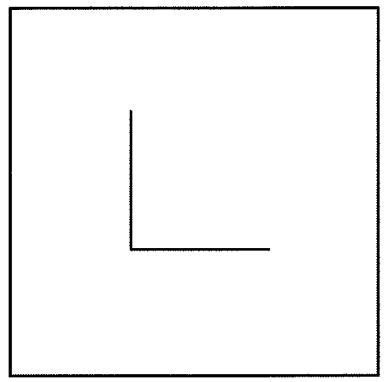
FIG. 1 is a drawing showing examples of edge patterns.
Figure 1B:
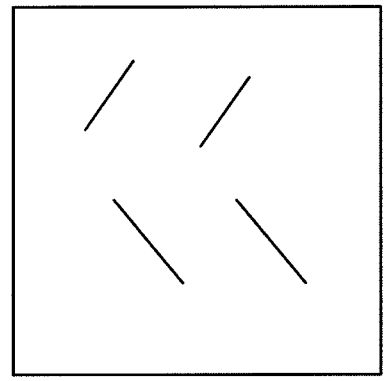
Figure 1C:
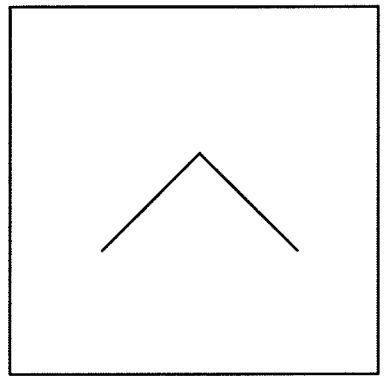
Figure 1D:
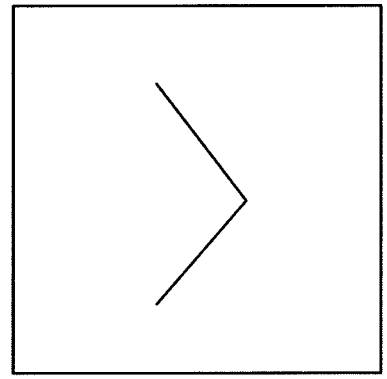
Figure 2:
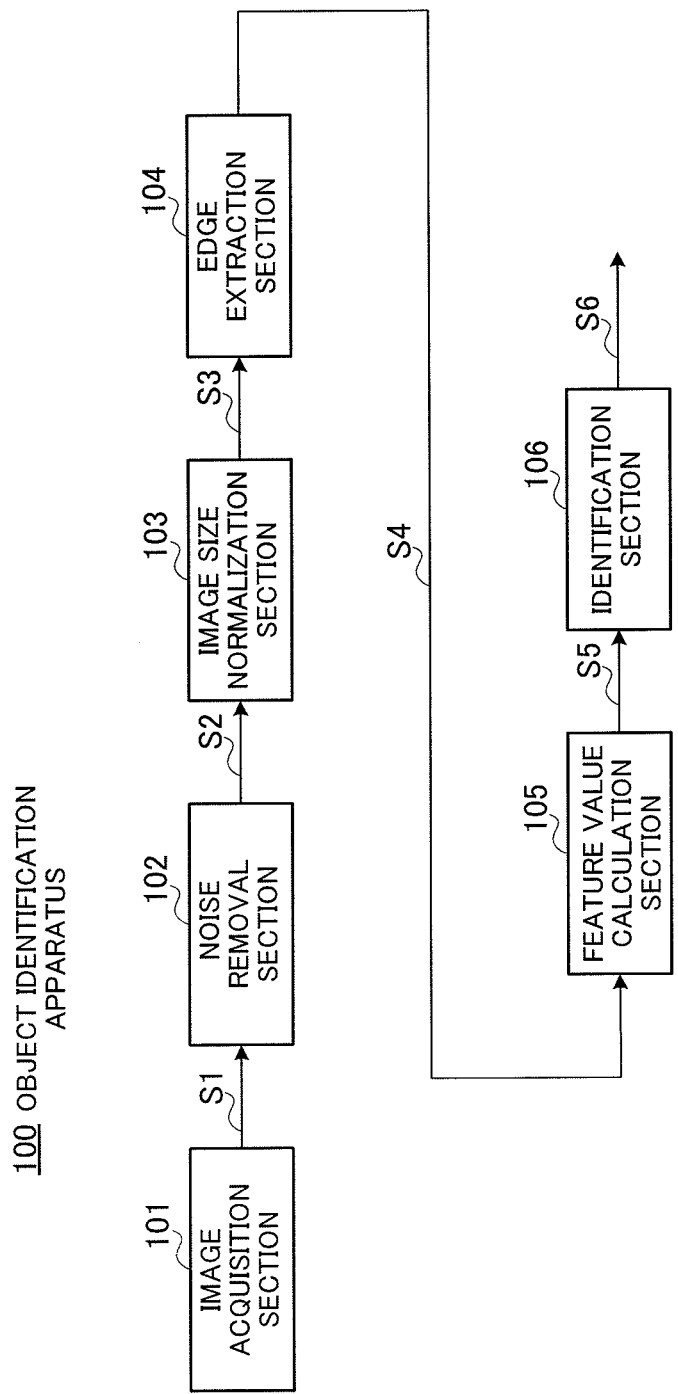
FIG. 2 is a block diagram showing the overall configuration of an object identification apparatus according to an embodiment of the present invention.

FIG. 2 shows the overall configuration of an object identification apparatus according to an embodiment of the present invention. In this embodiment, a case will mainly be described in which object identification apparatus 100 identifies a human image, but an identification object of object identification apparatus 100 is not limited to a human image.

Object identification apparatus 100 acquires an image by means of image acquisition section 101. Image acquisition section 101 is a camera or scanner, for example. Image acquisition section 101 acquires an image, obtains grayscale image data S1 by performing cropping of a necessary part and execution of preprocessing called image transformation on the acquired image, and outputs this grayscale image data S1.

Noise removal section 102 removes noise from grayscale image data S1. In actuality, a noise removal filter can be used as noise removal section 102, and a median filter, sharp filter, mean filter, or the like, can be used as a noise removal filter. Grayscale image data S2 from which noise has been removed is output to image size normalization section 103.

Image size normalization section 103 performs size normalization of grayscale image data S2 from which noise has been removed. That is to say, image size normalization section 103 changes the size of an input grayscale image to a predetermined size. For example, an enlargement operation is performed if the input image is smaller than the predetermined size, or a reduction operation is performed if the input image is larger than the predetermined size. In the example in this embodiment, a size of 64 (pixels)×128 (pixels) is used as an image normalization size, and all images are converted to a 64 (pixel)×128 (pixel) image size. Image data S3 that has undergone size normalization is output to edge extraction section 104.

Edge extraction section 104 extracts an edge from grayscale image data S3 that has undergone size normalization. Edge extraction section 104 obtains edge direction image data S4 by differentiating the grayscale image data S3, for example. Edge direction image data S4 is output to feature calculation section 105.

Feature calculation section 105 calculates feature S5 from edge direction image data S4, and outputs this to identification section 106. Based on feature S5, identification section 106 identifies whether or not an input image (that is, an image acquired by image acquisition section 101) is a human image.

[Feature Calculation Section]

Figure 3:
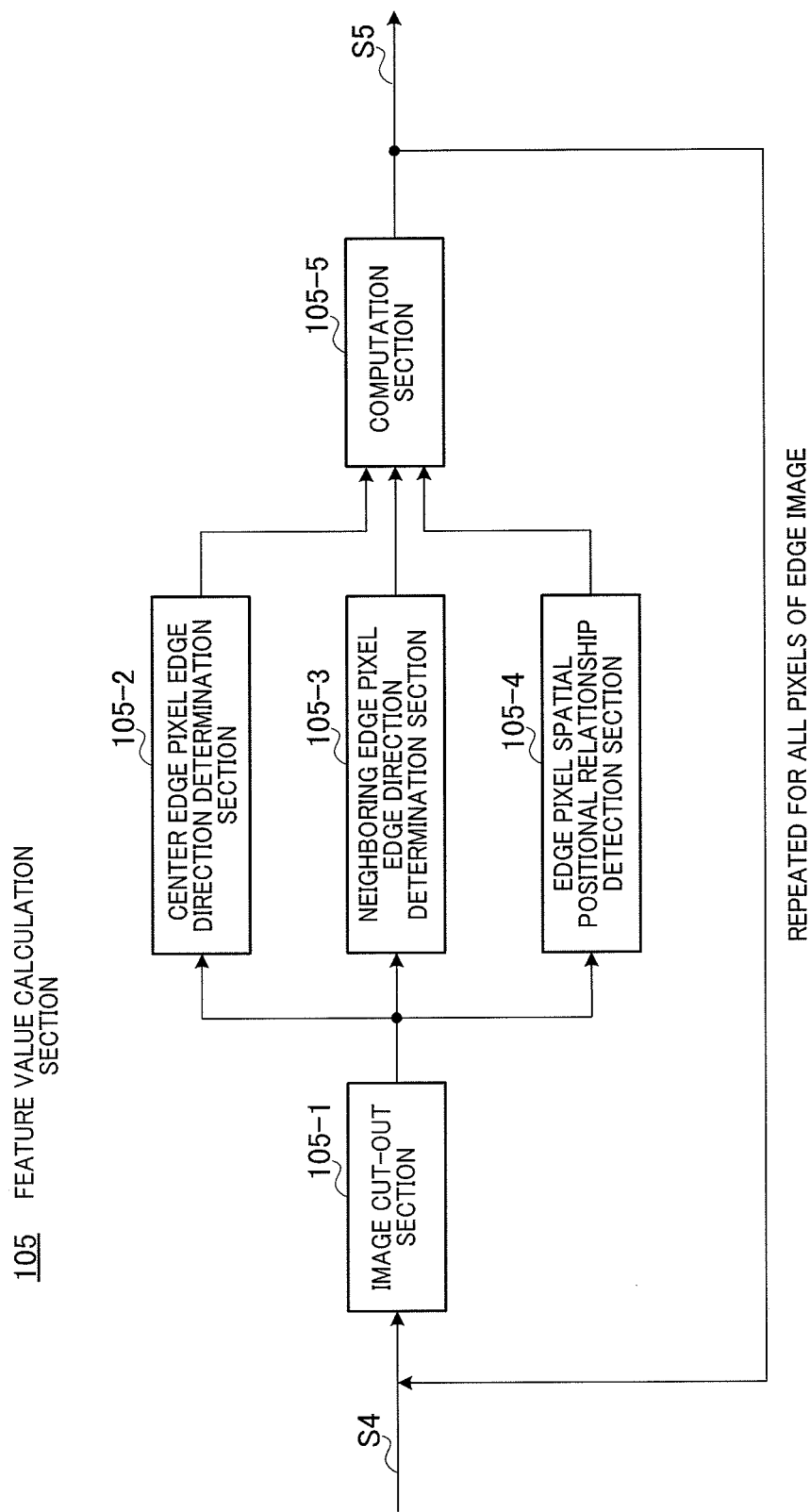
FIG. 3 is a block diagram showing the configuration of a feature calculation section.
Figure 4A:
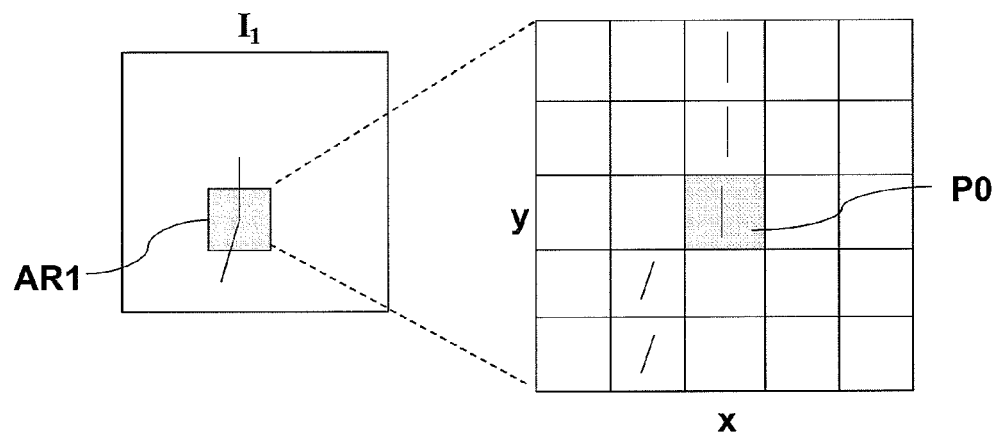
FIG. 4A is a drawing showing an example of an edge pattern that often appears in human images.
Figure 4B:
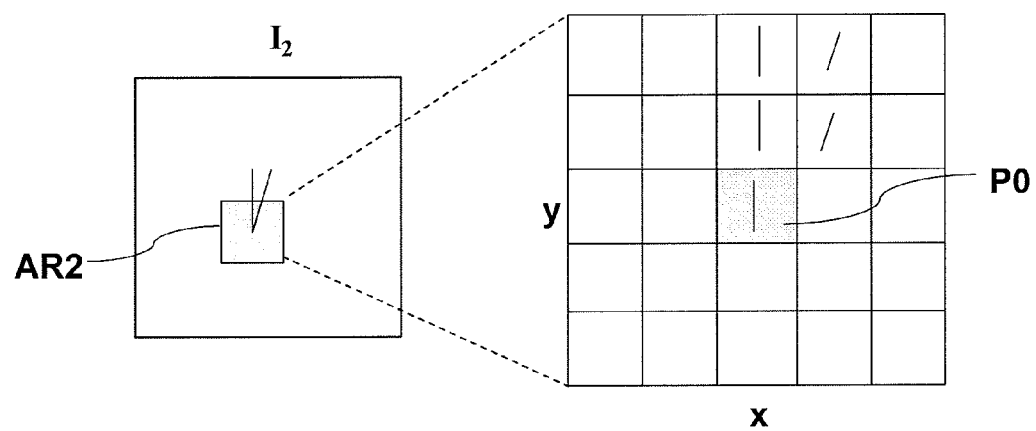
FIG. 4B is a drawing showing an example of an edge pattern that often appears in images of a tree.

FIG. 3 shows the configuration of feature calculation section 105. Feature calculation section 105 inputs an edge direction image obtained by edge extraction section 104 to image cut-out section 105-1. Image cut-out section 105-1 cuts out images of predetermined areas AR1 and AR2 from the edge image, as shown in FIG. 4A and FIG. 4B. FIG. 4A and FIG. 4B show examples in which areas AR1 and AR2 are composed of 5 (pixels)×5 (pixels). FIG. 4A shows an example of an edge pattern that often appears in human images, and FIG. 4B shows an example of an edge pattern that often appears in images of a tree. Here, center pixel P0 of areas AR1 and AR2 is a reference point for spatial relationships.

A case in which area AR1 in FIG. 4A is cut out is described below as an example. Area AR1 internal edge image data is output to center edge pixel edge direction determination section 105-2, neighboring edge pixel edge direction determination section 105-3, and edge pixel spatial relationship detection section 105-4.

Figure 5:
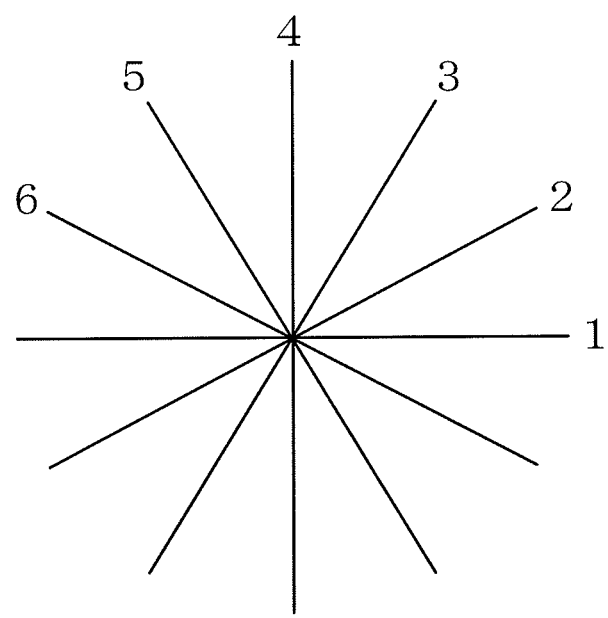
FIG. 5 is a drawing showing an example of edge directions.

Here, in this embodiment, edge directions are divided into 6 directions, for example, as shown in FIG. 5. The ranges of edge directions 1 through 6 are as follows.

Edge direction 1: 0° to 30°, 180° to 210°
Edge direction 2: 30° to 60°, 210° to 240°
Edge direction 3: 60° to 90°, 240° to 270°
Edge direction 4: 90° to 120°, 270° to 300°
Edge direction 5: 120° to 150°, 300° to 330°
Edge direction 6: 150° to 180°, 330° to 360°

The edge direction for a certain pixel is obtained by means of an arc tan computation of the difference (gradient) of brightness between that pixel and pixels horizontally and vertically adjacent to that pixel. If the difference in brightness is greater than a predetermined value, the edge direction of that pixel is taken as an obtained edge direction, and if the difference in brightness is less than or equal to the predetermined value, that pixel is determined not to be an edge image pixel, and the edge direction is taken to be −1.

Center edge pixel edge direction determination section 105-2 finds the edge direction of center pixel P0 (the coordinate (x, y) pixel) in FIG. 4A, and outputs the obtained edge direction to computation section 105-5.

Neighboring edge pixel edge direction determination section 105-3 finds the edge direction of an edge pixel present in a neighboring area of center pixel P0, and outputs the obtained edge direction to computation section 105-5. In the case of FIG. 4A, four edge pixels are present in a neighboring area of center pixel P0, and therefore neighboring edge pixel edge direction determination section 105-3 determines the edge direction of each of these four edge pixels.

Figure 6:
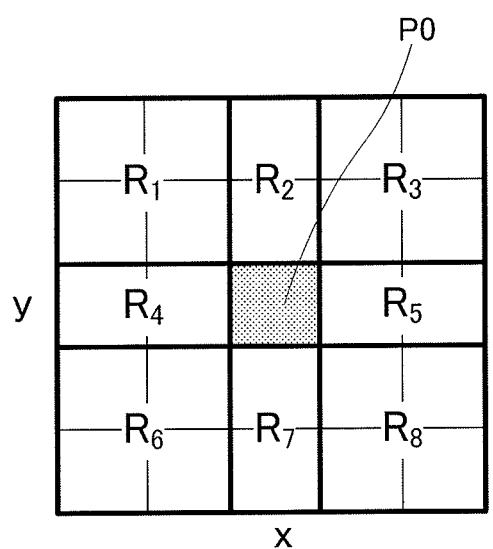
FIG. 6 is a drawing showing an example of neighboring area division.

In addition to this, feature calculation section 105 of this embodiment detects spatial relationships of edge pixels by means of edge pixel spatial relationship detection section 105-4. Edge pixel spatial relationship detection section 105-4 detects in which division area, among division areas resulting from dividing a neighboring area of center pixel P0 into a plurality of areas, an edge pixel present in a neighboring area of center pixel P0 is present. FIG. 6 shows an example of neighboring area division. In the example shown in FIG. 6, a neighboring area is divided into eight areas $R_1$ through $R_8$. Edge pixel spatial relationship detection section 105-4 detects in which of areas $R_1$ through $R_8$ each edge pixel is located.

Computation section 105-5 generates a three-dimensional histogram using detection results obtained by means of center edge pixel edge direction determination section 105-2, neighboring edge pixel edge direction determination section 105-3, and edge pixel spatial relationship detection section 105-4. This three-dimensional histogram can be called a spatial co-occurrence matrix of edge directions. This spatial co-occurrence matrix of edge directions will now be described.

Here, the number of edge directions is represented by $N_i$, and a certain number of $N_i$ (in the case of FIG. 4A, six) edge direction images $E_i$ are generated from provided M (pixel)×N (pixel) edge image S4. Here, $E_i$ is defined by the following equation.

(Equation 4)

$E_i(x,y)=1$, if the edge direction at position $(x,y)$ is $i$.

$E_i(x,y)=0$, otherwise [4]

Where i is the edge direction number, $i=1, \ldots, N_i$, $N_i$: Total number of edge directions Here, suppose the edge direction number of center pixel P0 that is the reference point of spatial relationships is designated i, the edge direction number of a pixel present in a neighboring area of center pixel P0 (in the case of FIG. 4A and FIG. 4B, 24 pixels around center pixel P0) is designated j, and the position number of a pixel present in a neighboring area of center pixel P0 is designated k, computation section 105-5 generates spatial co-occurrence matrix of edge direction $H_{SCO}(i, j, k)$ by means of the following equation.

(Equation 5)

$$H_{sco}(i, j, k) = \frac{1}{NM} \sum_{x=0}^{M-1} \sum_{y=0}^{N-1} \left[ E_i(x, y) \sum_{(x',y') \in R_k(x,y)} E_j(x', y') \right] \quad [5]$$

i,j: Edge direction number, $i=1, \ldots, N_i$, $j=1, \ldots, N_j$ $N_i$: Total number of edge directions k: Neighboring edge pixel position number, $k=1, \ldots, N_k$ $N_k$: Total number of division areas $R_k$ in FIG. 5 indicates a division area number, as shown in FIG. 6.

Spatial co-occurrence matrix of edge directions $H_{SCO}(i, j, k)$ represented by equation 5 calculates a number of edge pixels stipulated by an edge direction of a predetermined pixel (center pixel P0), an edge direction of an edge pixel present in a neighboring area of the predetermined pixel, and a spatial relationship between the predetermined pixel and an edge pixel present in the neighboring area, as a feature of an image. With spatial co-occurrence matrix of edge directions $H_{SCO}(i, j, k)$ represented by equation 5, edge spatial relationships are considered for an entire image, providing the capability of discrimination even of graphics for which discrimination is not possible by means of a conventional edge histogram (HOG) or a conventional co-occurrence matrix of edge directions.

Here, for example, the value of $H_{SCO}(4, 3, 3)$ is the number of pixel pairs with edge direction 3 (60° to 90°, 240° to 270°) pixels in the top-right direction (position $R_3$) with respect to an edge direction 4 (90° to 120°, 270° to 300°) pixel at the center. In the edge pattern that often appears in images of a tree shown in FIG. 4B, this value (feature) should be large. Specifically, in the case of the edge pattern in FIG. 4B, $H_{SCO}(4, 3, 3)=2$. In contrast, in the case of the edge pattern in FIG. 4A, $H_{SCO}(4, 3, 3)=0$.

Also, the value of $H_{SCO}(4, 3 6,)$ is the number of pixel pairs with edge direction 3 (60° to 90°, 240° to 270°) pixels in the bottom-left direction (position $R_6$) with respect to an edge direction 4 (90° to 120°, 270° to 300°) pixel at the center. In the edge pattern that often appears in images of a human being shown in FIG. 4A, this value (feature) should be large. Specifically, in the case of the edge pattern in FIG. 4A, $H_{SCO}(4, 3 6,)=2$. In contrast, in the case of the edge pattern in FIG. 4B, $H_{SCO}(4, 3, 6)=0$.

In this way, computation section 105-5 generates spatial co-occurrence matrix of edge directions $H_{SCO}(i, j, k)$ for all combinations of i, j, and k, utilizing all edge image pixels. In the example described in this embodiment, $i=1, 2, \ldots, 6, j=1, 2, \ldots, 6$, and $k=1, 2, \ldots, 8$, and therefore a spatial co-occurrence matrix of edge directions composed of 6×6× 8=288 pixels is obtained. That is to say, 288 features (as a three-dimensional histogram) are obtained as features S5.

[Identification Section]

Figure 7:
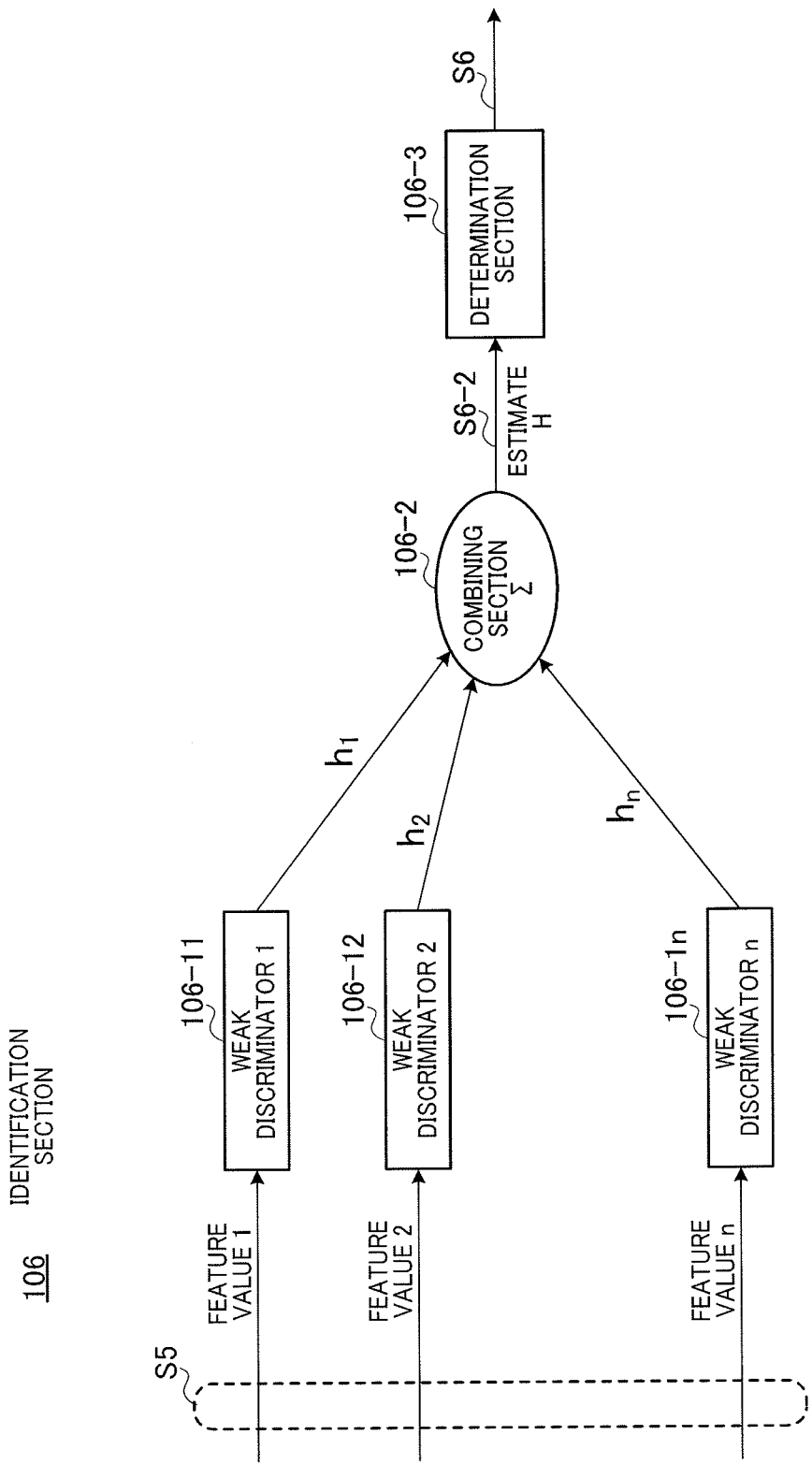
FIG. 7 is a block diagram showing the configuration of a identification section.

FIG. 7 shows the configuration of identification section 106. Identification section 106 has plurality of weak classifiers 106-11 through 106-1n, combining section 106-2, and determination section 106-3.

Weak classifiers 106-11 through 106-1n have features S5 (features 1 through n) obtained by feature calculation section 105 as input. The number of weak classifiers 106-11 through 106-1n provided corresponds to features 1 through n. In the example described in this embodiment, 288 weak classifiers are provided, but a smaller number than this may be utilized.

Weak classifiers 106-11 through 106-1n using features acquired by means of learning beforehand, and a corresponding classification function. Specifically, when identification of a human being is attempted by means of object identification apparatus 100, a large quantity of samples including human images and non-human images are used as training images in the learning process, output results S5 of feature calculation section 105 of object identification apparatus 100 are obtained, and weak classifiers 106-11 through 106-1n compose classification functions corresponding to each feature of a human image by performing learning by means of a machine learning method—for example, a boosting method.

Then, in actual image identification, estimates $h_1$ through $h_n$ comprising human beings corresponding to the features are output, using features 1 through n input from feature calculation section 105 and the above classification functions acquired beforehand by means of learning.

Estimates $h_1$ through $h_n$ are summed by combining section 106-2, and estimate H obtained thereby is output to determination section 106-3. Determination section 106-3 performs threshold value determination of estimate H, and if estimate H is greater than a predetermined threshold value, determines that the input image is a human image, and outputs determination result S6.

[Operation]

Figure 8:
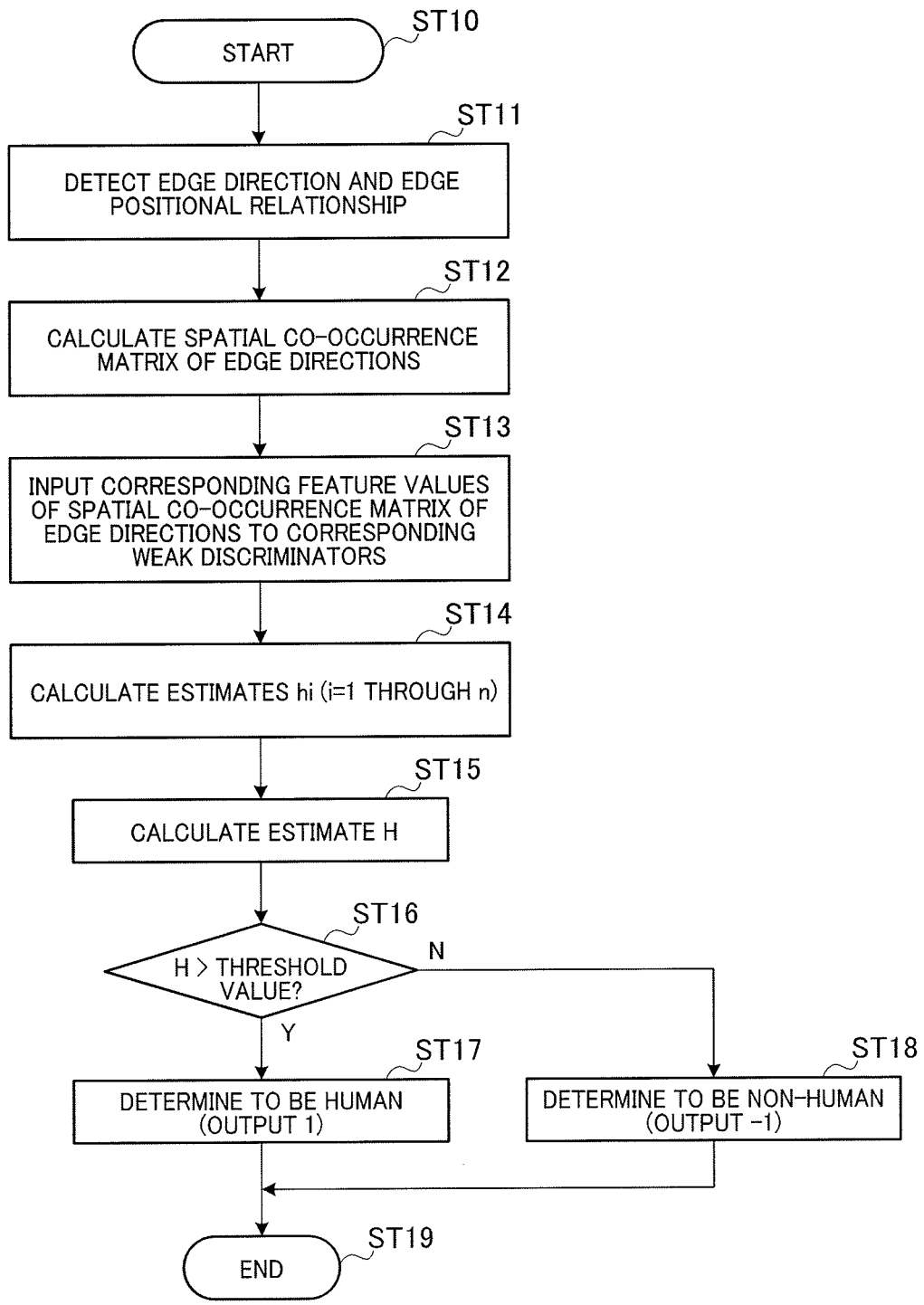
FIG. 8 is a flowchart provided to explain the operation of a feature calculation section and identification section.

The operation of object identification apparatus 100 will now be described using FIG. 8. Here, the operation of feature calculation section 105 and identification section 106, which are features of the present invention, will be described in particular.

After object identification apparatus 100 starts feature calculation and identification processing in step ST10, in step ST11, center edge pixel edge direction determination section 105-2, neighboring edge pixel edge direction determination section 105-3, and edge pixel spatial relationship detection section 105-4 in feature calculation section 105 detect the edge direction of each edge pixel and edge spatial relationships for all the pixels of an image.

Then, in step ST12, computation section 105-5 of feature calculation section 105 calculates a spatial co-occurrence matrix of edge directions by means of equation 5 as features S5.

Then, in step ST13, corresponding features that are elements of the spatial co-occurrence matrix of edge directions (features 1 through n) are input to corresponding weak classifiers 106-11 through 106-1n.

Then, in step ST14, weak classifiers 106-11 through 106-1n calculate estimates $h_i$ (where i=1 through n), and in step ST15, combining section 106-2 calculates estimate H.

Then, in step ST15, determination section 106-3 performs threshold value determination of estimate H. If estimate H is greater than a threshold value, determination section 106-3 proceeds to step ST17, determines that the input image is a human image, and outputs "1" as determination result S6. On the other hand, if estimate H is less than or equal to the threshold value, determination section 106-3 proceeds to step ST18, determines that the input image is a non-human image, and outputs "−1" as determination result S6.

After step ST17 or step ST18, feature calculation and identification processing is terminated in step ST19.

[Effects]

As described above, according to this embodiment, feature calculation section 105 can obtain feature S5 that also represents a spatial relationship of edges by calculating as feature S5 of an image a number of edge pixels (three-dimensional histogram) stipulated by an edge direction of a predetermined pixel (in this embodiment, a center pixel), an edge direction of an edge pixel present in a neighboring area of the predetermined pixel, and a spatial relationship to an edge pixel present in a neighboring area of the predetermined pixel. As a result, a difference in edge patterns due to a difference in spatial relationships of edges can be identified, and the accuracy of identification of a human image, for example, can be improved.

Also, a spatial co-occurrence matrix of edge directions (feature) calculated by this embodiment is a global feature, enabling a feature to be obtained that is robust with respect to positional displacement or posture variation of a human being in an image.

[Other Embodiments]

In the above embodiment, a case has been described in which calculation as a feature is performed of a number of edge pixels (three-dimensional histogram) stipulated by an edge direction of a predetermined pixel, an edge direction of an edge pixel present in a neighboring area of the predetermined pixel, and a spatial relationship to an edge pixel present in a neighboring area of the predetermined pixel, but, for example, a number of edge pixels (two-dimensional histogram) stipulated by an edge direction of a predetermined pixel, and a spatial relationship to an edge pixel present in a neighboring area of the predetermined pixel, may also be calculated as a feature of an image.

In this case, the configuration of feature calculation section 105 can be made a configuration in which neighboring edge pixel edge direction determination section 105-3 is omitted from the configuration in FIG. 3, and computation section 105-5 can generate spatial co-occurrence matrix of edge directions H1(i,k) by means of the following equation.

(Equation 6)

$$H_1(i, k) = \frac{1}{NM} \sum_{x=0}^{M-1} \sum_{y=0}^{N-1} \left[ E_i(x, y) \sum_{j=1}^{N_j} \sum_{(x', y') \in R_k(x, y)} E_j(x', y') \right] \quad [6]$$

i: Edge direction number, i=1, ..., $N_i$
$N_i$: Total number of edge directions
k: Edge pixel position number, k=1, ..., $N_k$
$N_k$: Total number of division areas In this case, identification accuracy will probably be lower than in the above embodiment, but a feature whereby a spatial relationship of edges is represented can be obtained in the same way as in the above embodiment, and therefore a difference in edge patterns due to a difference in spatial relationships of edges can be identified.

Also, a number of edge pixels (two-dimensional histogram) stipulated by an edge direction of an edge pixel present in a neighboring area of a predetermined pixel, and a spatial relationship to an edge pixel present in a neighboring area of the predetermined pixel, may also be calculated as a feature of an image.

In this case, the configuration of feature calculation section 105 can be made a configuration in which center edge pixel edge direction determination section 105-2 is omitted from the configuration in FIG. 3, and computation section 105-5 can find spatial co-occurrence matrix of edge directions $H_2$(j, k) by means of the following equation.

(Equation 7)

$$H_2(j, k) = \sum_{i=1}^{N_j} \frac{1}{NM} \sum_{x=0}^{M-1} \sum_{y=0}^{N-1} \left[ E_i(x, y) \sum_{(x', y') \in R_k(x, y)} E_j(x', y') \right] \quad [7]$$

j: Edge direction number, j=1, ..., $N_j$
$N_j$: Total number of edge directions
k: Edge pixel position number, k=1, ..., $N_k$
$N_k$: Total number of division areas In the above embodiments, a case has been described in which identification section 106 is configured as having plurality of weak classifiers 106-11 through 106-1n, but the configuration of identification section 106 is not limited to this. The present invention has, as a particular feature, feature calculation processing by feature calculation section 105, and therefore other configuration elements may be changed arbitrarily.

The disclosure of Japanese Patent Application No. 2008-288864, filed on Nov. 11, 2008, including the specification, drawings and abstract, is incorporated herein by reference in its entirety.

Industrial Applicability

The present invention has an effect of enabling a difference in edge patterns due to a difference in spatial relationships of edges to be identified, and is suitable for identifying a human image, for example.

The invention claimed is:

1. A feature extracting apparatus comprising:
an edge image extractor that extracts edges from an image; and
a feature calculator that calculates a spatial co-occurrence matrix as a feature of the image, the spatial co-occurrence matrix including elements for a number of combinations between at least one of an edge direction of a predetermined pixel and an edge direction of an edge pixel present in a neighboring area of the predetermined pixel, and a position of a division area including the edge pixel in the neighboring area of division areas resulting from dividing the neighboring area.

2. The feature extracting apparatus according to claim 1, wherein the spatial co-occurrence matrix includes elements for a number of products of an edge direction number of the predetermined pixel, an edge direction number of an edge pixel present in each division area in the neighboring area and a number of division areas.

3. A feature extracting apparatus comprising:
an edge image extractor that extracts edges from an image; and
a feature calculator that calculates a feature of the image by equation 1 or equation 2 below:

$$H_1(i, k) = \frac{1}{NM} \sum_{x=0}^{M-1} \sum_{y=0}^{N-1} \left[ E_i(x, y) \sum_{j=1}^{N_i} \sum_{(x', y') \in R_k(x,y)} E_j(x', y') \right]$$ (Equation 1)

i, j: Edge direction number, i=1, ..., $N_i$, j=1, ..., $N_i$
$N_i$: Total number of edge directions
k: Edge pixel position number, k=1, ..., $N_k$
$N_k$: Total number of division areas $$H_2(j, k) = \sum_{i=1}^{N_j} \frac{1}{NM} \sum_{x=0}^{M-1} \sum_{y=0}^{N-1} \left[ E_i(x, y) \sum_{(x', y') \in R_k(x,y)} E_j(x', y') \right]$$ (Equation 2)

i, j: Edge direction number, i=1, ..., $N_j$, j=1, ..., $N_j$
$N_j$: Total number of edge directions
k: Edge pixel position number, k=1, ..., $N_k$
$N_k$: Total number of division areas
where in equation 1 and equation 2, N and M indicate a vertical-direction and horizontal-direction number of pixels of an object image for which the feature is calculated, (x, y) indicates coordinates of a predetermined pixel, $R_k$(x, y) indicates a k'th division area in a neighboring area of pixel (x, y), and $E_i$ and $E_j$ are defined by the following equation 3:

$E_i(x,y)=1$, if the edge direction at position (x,y) is i.

$E_i(x,y)=0$, otherwise (Equation 3)

i: Edge direction number i=1, ..., $N_i$
Ni: Total number of edge directions.

4. A feature extracting apparatus comprising:
an edge image extractor that extracts edges from an image; and
a feature calculator that calculates a feature of the image by means of equation 4 below:

$$H_{sco}(i, j, k) = \frac{1}{NM} \sum_{x=0}^{M-1} \sum_{y=0}^{N-1} \left[ E_i(x, y) \sum_{(x', y') \in R_k(x,y)} E_j(x', y') \right]$$ (Equation 4)

i, j: Edge direction number, i=1, ..., $N_i$, j=1, ..., $N_i$
$N_i$: Total number of edge directions
k: Edge pixel position number, k=1, ..., $N_k$
$N_k$: Total number of division areas
where, in equation 4, N and M indicate a vertical-direction and horizontal-direction number of pixels of an object image for which a feature is calculated, (x, y) indicates coordinates of a predetermined pixel, $R_k$(x, y) indicates a k'th division area in a neighboring area of pixel (x, y), and $E_i$ and $E_j$ are defined by equation 5 below:

$E_i(x,y)=1$, if the edge direction at position (x,y) is i.

$E_i(x,y)=0$, otherwise (Equation 5)

i: Edge direction number i=1, ..., $N_i$
Ni: Total number of edge directions.

5. An object identification apparatus comprising:
an edge extractor that generate edge images from a gray-scale scale image; and
a feature calculator that calculates a number of edge pixels stipulated by at least one of an edge direction of a predetermined pixel and an edge direction of an edge pixel present in a neighboring area of the predetermined pixel, and a spatial relationship between the predetermined pixel and the edge pixel present in the neighboring area, as a feature of an image,
a plurality of weak classifiers that receive a plurality of features obtained by the feature calculator as an input, and output estimates from the input plurality of features and a classification function acquired by learning beforehand;
a combiner that sums the estimates output from the plurality of weak classifiers; and
a determiner that performs a threshold value determination of a summed estimate.

6. A feature extracting method comprising:
extractings edges from an image, by an edge image extractor; and
calculating a spatial co-occurrence matrix as a feature of the image, by a feature calculator, the spatial co-occurrence matrix including elements for a number of combinations between at least one of an edge direction of a predetermined pixel and an edge direction of an edge pixel present in a neigh area of the predetermined pixel, and a position of a division area including the edge pixel in the neighboring area of division areas resulting from dividing the neighboring area.

* * * * *